March 26, 1957  E. J. SCHAEFER  2,786,953
WATT SENSITIVE DEVICE
Filed Jan. 25, 1956
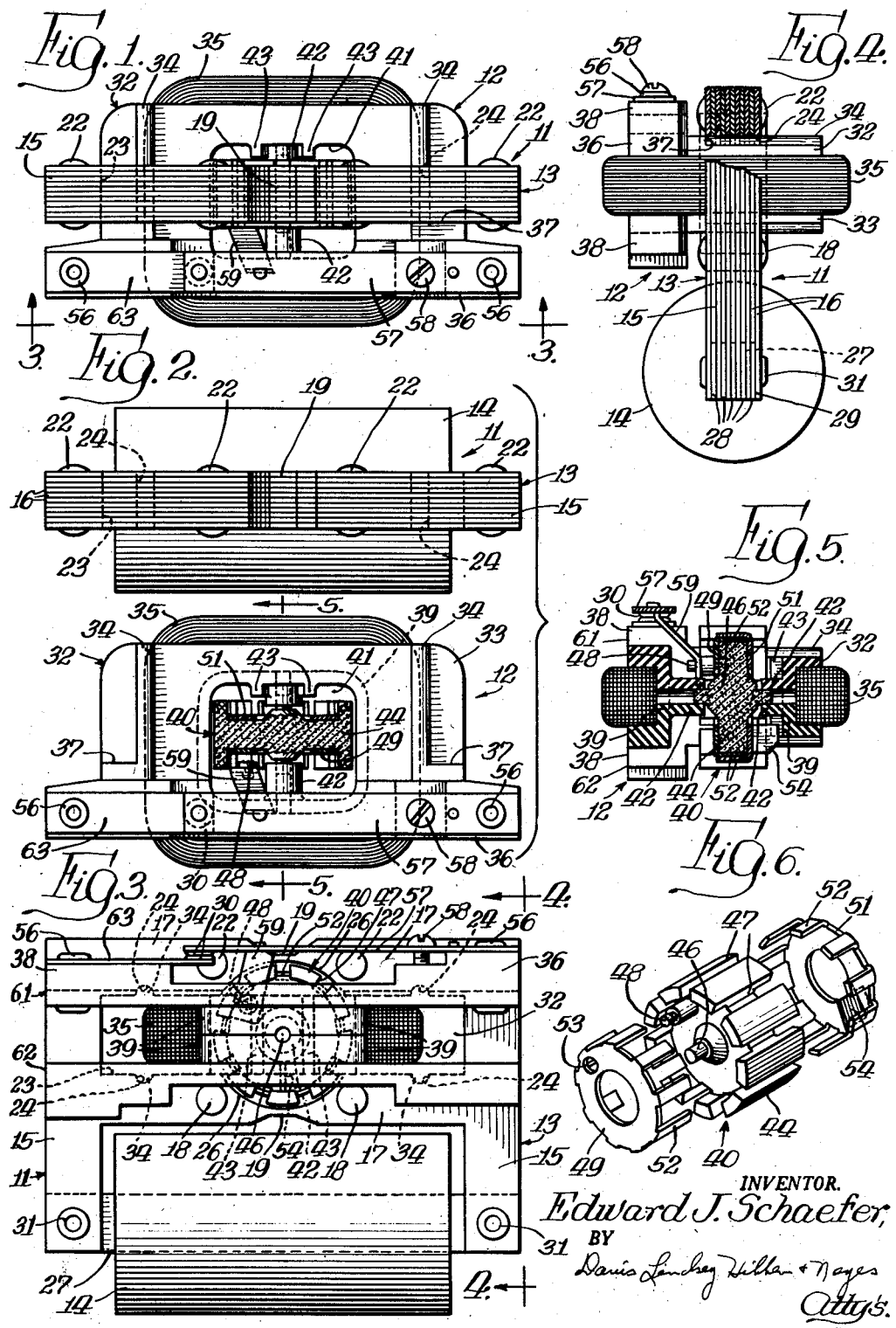
INVENTOR.
Edward J. Schaefer

United States Patent Office 2,786,953
Patented Mar. 26, 1957

2,786,953

WATT SENSITIVE DEVICE

Edward J. Schaefer, Fort Wayne, Ind.

Application January 25, 1956, Serial No. 561,190

22 Claims. (Cl. 310—166)

This invention relates to generally electrical devices and more particularly to watt sensitive devices.

Heretofore, numerous types of watt sensitive devices have been developed, such as watt meters, power directional relays, power factor relays and the like, all of which respond to a "power" characteristic of the circuit in which they are installed. Those "power" characteristics to which they may respond have been defined generally, mathematically, by an expression of the product of volts times amps times a function of the phase angle between them, e. g. for watts, the expression being EI times the cosine of the angle. Obviously, such devices find wide application in the electrical field.

My copending patent application Ser. No. 532,901 covering a low water protective circuit for a motor driven pump illustrates an installation in which such a watt sensitive device is employed. In that application the device utilized is a watt sensitive rely.

Because of the nature of many of the installations in which it is most appropriate to use watt sensitive devices, such as is described in my pump protection circuit, it is desirable that such devices be compact, rugged, dependable and inexpensive.

Accordingly, it is a primary object of this invention to provide a novel alternating current watt sensitive device that is inexpensive to manufacture and is rugged and compact in construction.

Another object of the invention is to provide a novel alternating current watt sensitive device that is easily assembled.

A further object of the invention is to provide a novel alternating current watt sensitive device having a rotor of simple and inexpensive construction.

Still another object of the invention is to provide a novel watt sensitive relay.

Other objects and advantages of the invention will become apparent from the subsequent description taken in conjunction with the accompanying drawings wherein:

Fig. 1 is a plan view of one specific embodiment of the invention, namely an assembled watt sensitive relay;

Fig. 2 is a plan view of the component units of the watt sensitive relay shown in Fig. 1 before assembly and showing its rotor in section;

Fig. 3 is an elevation of the relay as seen from the line 3—3 of Fig. 1;

Fig. 4 is an end elevation of the relay as seen from line 4—4 of Fig. 3;

Fig. 5 is a sectional view of one of the units shown in Fig. 2 and taken along line 5—5 of Fig. 2; and Fig. 6 is an exploded perspective view of the rotor assembly.

In general, the objects of the invention are accomplished by structural improvements which permit assembly of the components comprising the device into easily assembled units, or sub-assemblies. The sub-assemblies are adapted to slidably engage each other and are thus united to form a compact, rugged device. Because of the facility with which each unit may be made and with which the units may be assembled, an inexpensive structure results.

As in all power or watt sensitive devices, the instant relay comprises generally a potential coil, a current coil, a rotor arranged in such a manner that its rotation is responsive and proportional to the flux generated by the two coils, and a mechanism actuated by the rotor element which is in this instance for making or breaking a circuit connection in response to a certain predetermined power characteristic. In these respects the instant power sensitive device is similar to those heretofore developed.

Referring to the drawing, Figs. 1, 3 and 4 show a specific embodiment of the invention, a watt sensitive relay, assembled, and illustrate the general structural compactness of such a device. To achieve the desired compactness and ease of assembly, the components of the device are pre-assembled into major units or sub-assemblies comprising in the instant embodiment two units, namely, a potential coil unit shown generally at 11 and a bobbin unit indicated generally at 12. The units 11 and 12 are adapted to be attached together, and in the preferred embodiment, as best seen in Fig. 2, are adapted to be assembled by slidably inserting the bobbin unit 12 into the potential coil unit 11 as will be more fully described hereinafter.

The potential coil unit 11 comprises generally a core structure 13 and a potential coil 14. The core structure 13 serves as a frame for supporting the device and is in addition a core for transmitting magnetic flux generated by potential coil 14 into a field to actuate a rotor. To serve as such, core structure 13 is necessarily a circuit of magnetic material constructed to provide an external magnetic field. To most efficiently transmit flux, a laminated structure is preferable, all of which being well understood in the art. In the instant embodiment, structure 13 comprises a pair of F-shaped members 15, each having a pair of parallel arms 17 spaced from each other and extending at substantially right angles to the vertical portion of the F. Each member 15 comprises a stack of iron laminae 16 which is secured together by means of fasteners, such as rivets 18 and 22. The F-shaped members 15 are positioned with the arms 17 extending toward each other, as best seen in Fig. 3, and are connected together in the instant embodiment by a portion having a saturation notch 19 which is sufficiently deep to provide the necessary external magnetic field.

The potential coil 14 is of the character normally used in such devices, being a relatively high resistance unit and adapted to be inserted in a circuit for creating a magnetic field responsive to changing potential, as is well understood in the art. To transmit the flux generated by it, coil 14 is operatively mounted on the core structure 13 and in this instance, the coil 14 is mounted on a coil supporting portion 27 of the core structure 13. The coil supporting portion 27 comprises a plurality of laminae 28 adapted to extend through coil 14 and between the lower portions of F-members 15 with the F-members 15 and the coil supporting portion 27 connected to each other. To form a juncture therebetween, which is no thicker than the thickness of the joined structures, the juncture is accomplished by alternately shortening each alternate lamina 16 and each alternate lamina 28 by the width of its associated lamina. After positioning potential coil 14 on the coil supporting portion, the longer laminae are interleaved as shown at 29 in Fig. 4, and are secured together as by rivets 31, thus completing the magnetic circuit of the core structure 13.

To adapt the core structure for operative association with the bobbin assembly 11, core structure 13 is constructed so that the spacing of the arms 17 defines a space 23 therebetween, which is dimensioned to slidably, yet snugly, receive the bobbin assembly 12 therein. The arms 17 have an arcuate portion 26 adjacent notches 19 to operatively accommodate a rotor positioned in the bobbin assembly 12 as hereinafter described.

In the specific embodiment of the invention, the bobbin unit 12 comprises generally the remaining elements of the relay, which include a bobbin, a current coil, rotor and contact elements all compactly arranged. The bobbin, indicated at 32 in the instant case, serves as the unit frame, upon which the other elements of the unit are mounted. Bobbin 32 is constructed of non-magnetic, non-conducting material, such as Bakelite, or the like. It is provided with a generally rectangular frame portion 33 adapted to extend snugly through the opening 23 defined by the arms 17. To facilitate accurate positioning in the opening 23, interengaging means are provided on the two units. Thus, frame 33 is provided with at least one, and in this instance, four guide ribs 34 adapted to engage grooves 24 in the arms 17. As a further aid to positioning the bobbin unit 12 and for supporting contact elements 30 as hereinafter described, bobbin 32 is provided, in this instance, with a supporting portion 36 having abutment means 37 adapted to engage the side of core structure 13. Means 37 thus limits the extent of movement of the unit 12 through opening 23.

To facilitate fabrications and assembly of the bobbin unit 12, in the instant embodiment, bobbin 32 comprises a pair of identical mating members 61 and 62, each of which comprises a generally rectangular frame portion having the ribs 34 formed thereon, and a raised portion 38 along one edge for forming the supporting portion 36. In addition, in order to provide a support for current coil 35, each of the members is provided with a flange portion 39, around the central opening 41 defined by the frame 33. Further, to operatively support a rotor 40 in the field of current coil 35 and the external field adjacent the saturation notches 19, flange portion 39 is provided with a pair of half round bearing bosses 42, positioned one opposite the other across opening 41, so that their axes will be in alignment with each other in the plane of the notches 19 and transverse to the plane of the core structure 13 when unit 12 is united with it. The flange portion 39 is also provided with a pair of rib portions 43, positioned one on either side of one of the bosses 42, and projecting into opening 41 for coacting with the rotor to limit its rotation. The bobbin 32 is formed, on assembly, by placing the pair of members so that their flange portions 39 are in abutment. This also brings the bearing bosses 42 and the rib portions 43 together.

Current coil 35 is also of the character normally used in such devices, being a low resistance coil and adapted to be inserted in a circuit. Its purpose is to create a magnetic field which is responsive to changes in current, as is well known in the art. On assembly of the unit 12, coil 35 is wound around the bobbin 32, and in the instant case around its abutting flange portions 39.

The rotor 40 is rotatably journaled in the bearing bosses 42, and is thus positioned to be acted upon by the magnetic field created by a current flow through coil 35. In addition, upon assembly of units 12 and 13, the rotor 40 is disposed adjacent notches 19 and in operative relation to the arcuate portions 26 of arms 17, and is thus positioned to be acted upon by the magnetic field created by potential coil 14.

In the preferred embodiment, rotor 40 is a "squirrel cage" rotor and, as best seen in Fig. 6, comprises a core member 44 of a magnetic material, in this instance, being a sintered high density member of pressed powdered iron. Core member 44 is formed with integral journals 46 adapted to be supported by bearings 42, and having around its periphery a plurality of equally spaced slots 47 parallel to its axis of rotation. In addition, member 44 is provided with a crank pin 48 for transmitting its movement.

To complete the rotor, conductors are placed in the slots 47 and interconnected at their ends. This is simply accomplished in this embodiment by a pair of non-magnetic conductive plates 49 and 51 such as copper or the like, having a plurality of prongs 52 adapted to be bent into slots 47. One plate 49 is provided with a hole 53 adapted to permit the passage of crank pin 43 therethrough. The other plate 51 has a wing 54 bent at an angle to the plane of the plate and adapted to project into the space between ribs 43 upon assembly, and is engageable with ribs 43 during operation for limiting the extent of rotation of rotor 40. The rotor 40 is assembled by placing the plates 49 and 51 on the ends of the core 44, bending the prongs 52 into slots 47, so that the prongs of plate 49 contact those of 51, such as by overlapping them, as shown in Fig. 5, and soldering them in position.

Rotation of the rotor in response to the power characteristics of the circuit is utilized to effect operation of a mechanism. In the instant embodiment the mechanism is a switch adapted to be inserted in the circuit to be controlled and comprises a pair of contact elements 30 mounted on the supporting portion 38, one element being fixed and the other being movable in response to rotation of the rotor 40. While movement of the movable element 30 may either open or close the switch as desired, in the present instance the movable element is moved away from the fixed element on rotation of the rotor in response to the power characteristics.

In order to open the contact elements 30 when a given power characteristic is met, and to close them, when the characteristic is not met, the relay is provided with spring means for resisting the rotation of the rotor. In this instance the spring means comprises a conducting leaf spring 57 which is mounted on the supporting portion 36. Spring 57 carries the movable contact element 30 and is secured to the bobbin by a suitable fastener, such as one of the terminals 56. A link 59 engages the crank-pin 48 and is operatively attached to spring 57 so that contacts 30 will not only until the rotor torque is sufficient to overcome the tension in spring 57. The fixed contact element 30 in this instance is also secured to the supporting portion 36 by being mounted on a fixed conducting arm 63, and secured to the bobbin by the other of the terminals 56. Terminals 56 also afford the means for connecting the contact elements into a circuit.

In addition to translating the rotor rotation into the action of a mechanism, it is desirable that the device have means for calibrating it for action at a specific predetermined characteristic. Recognizing that the torque developed in the rotor will be proportional to power, it is seen that adjustment of the resistance to the rotation of the rotor may be used to effect such calibration. To this end in the specific embodiment illustrated, the resistance offered by the conducting leaf spring 57 carrying the movable contact element 30 is adjustable by a calibrating screw 58 extending through the leaf spring 57 and threaded in the supporting portion 36. By tightening down the screw 58, the leaf spring 57 will offer a greater resistance to rotation of the rotor.

It is thus seen that a novel watt sensitive alternating current device is provided which is simply constructed, easily and quickly assembled, compact, and rugged and which is inexpensive in that it is formed by uniting mating preassembled units, and has a rotor of simple and inexpensive construction.

Although the invention has been described in connection with a certain specific structural embodiment, it is to be understood that various modifications and alternative structures may be resorted to without departing from the scope of the invention as defined in the appended claims.

I claim:

1. A watt sensitive device of the character described comprising a potential coil unit comprising a core structure, and a potential coil around a portion of said core structure, and a pre-assembled bobbin unit operatively attached to said core structure, said bobbin unit comprising a bobbin, a current coil mounted on said bobbin, a rotor rotatably supported by said bobbin, and mechanism actuated in response to the rotation of said rotor, rotation of said rotor being in response to flux generated by said potential and current coils.

2. A watt sensitive device of the character described comprising a potential coil unit, and a pre-assembled bobbin unit, said units having slidably engageable means for holding them in fixed relation to each other, said potential coil unit comprising a core structure, and a potential coil mounted on said core structure, said bobbin unit comprising a bobbin, a current coil mounted on said bobbin, a rotor rotatably supported by said bobbin, and a mechanism actuated by said rotor, said rotor being rotatable in response to flux generated by said coils, said slidably engageable means being formed on said core structure of the potential coil unit and on said bobbin of said bobbin unit.

3. A watt sensitive device of the character described comprising a potential coil unit comprising a core structure having a pair of parallel bar portions, each provided with a portion of reduced width intermediate its ends, and a potential coil mounted on said core structure, and a pre-assembled bobbin unit comprising a bobbin extending between said bar portions, a current coil mounted on said bobbin, a rotor rotatably supported by said bobbin between said bar portions adjacent said reduced portions therein, and a mechanism movable in response to the rotation of the rotor, rotation of said rotor being in response to flux generated by said coils, said bar portions and said bobbin having interengaging portions to hold the bobbin unit in fixed relation to said potential coil unit.

4. A watt sensitive device according to claim 3 and further characterized in that said interengaging portions comprise transversely extending grooves in said bar portions and complementary ribs on said bobbin.

5. A watt sensitive device of the character described comprising a potential coil unit comprising a core structure comprising a pair of F shaped portions positioned with their arms extending toward and connected to each other, and a coil supporting portion connecting the lower ends of the F shaped portions, and a potential coil mounted on said coil supporting portion, and a pre-assembled bobbin unit comprising a bobbin extending between said arms, a current coil mounted on said bobbin, a rotor rotatably supported by said bobbin between said arms and adjacent the connection between said arms, and a mechanism movable in response to the rotation of the rotor, rotation of said rotor being in response to flux generated by said coils, said arms and said bobbin having interengaging portions to hold the bobbin unit in fixed relation to said potential coil unit.

6. The watt sensitive device of claim 5 further characterized in that the connections between the arms of said F shaped portions are provided with saturating notches which reduce the width thereof.

7. A watt sensitive device of the character described comprising a potential coil unit comprising a core structure having a pair of parallel bar portions shaped intermediate their ends to provide an external field, and a potential coil mounted on said core structure, and a pre-assembled bobbin unit comprising a bobbin having a supporting portion along one side of the core structure, and a generally rectangular frame portion extending between said parallel bar portions, a current coil mounted on said frame portion, a rotor rotatably mounted within said frame portion in operative association with said field, and a mechanism movable in response to the rotation of said rotor, rotation of said rotor being in response to flux generated by said coils, said bar portions and said frame portion having interengaging portions to hold the bobbin unit in fixed relation to said potential coil unit.

8. A watt sensitive device of the character described comprising a potential coil unit comprising a core structure having a pair of parallel bar portions, each provided with a portion of reduced width intermediate its ends, and a potential coil mounted on said core structure, and a pre-assembled bobbin unit comprising a bobbin having a generally rectangular frame portion extending between said parallel bar portions, a current coil mounted on said frame portion, a pair of bearings formed on and positioned within said frame portion, a rotor rotatably mounted in said bearings between said bar portions and adjacent said reduced portions, and a mechanism movable in response to the rotation of the rotor, rotation of said rotor being in response to flux generated by said coils, said bar portions and said frame portion having interengaging portions to hold the bobbin unit in fixed relation to said potential coil unit.

9. A watt sensitive device of the character described comprising a potential coil unit comprising a core structure having a pair of parallel bar portions, each provided with a portion of reduced width intermediate its ends, and a potential coil mounted on said core structure, and a pre-assembled bobbin unit extending between said bar portions, said bobbin unit comprising a bobbin comprising a pair of members each having a generally rectangular frame portion provided with flanges about the opening in said frame portion with said flanges of the two members in abutment and each having a pair of half round bosses formed on the flanges thereof and cooperating with the bosses on the other member to provide bearings, a current coil wound on said flanges, a rotor rotatably supported by said bearings between said bar portions adjacent said reduced portions therein, and a mechanism movable in response to the rotation of said rotor, rotation of said rotor being in response to flux generated by said coils, said bar portions and said members having interengaging portions to hold the bobbin unit in fixed relation to said potential coil unit.

10. A watt sensitive relay comprising a potential coil unit comprising a core structure, and a potential coil around a portion of said core structure, and a pre-assembled bobbin unit comprising a bobbin, a current coil mounted on said bobbin, a pair of contact elements secured to said bobbin with one of said elements movable, and means for actuating said movable element in response to rotation of the rotor, rotation of said rotor being in response to flux generated by said potential and current coils.

11. A watt sensitive relay comprising a potential coil unit comprising a core structure, and a potential coil around a portion of said core structure, and a pre-assembled bobbin unit attached to said core structure, said bobbin unit comprising a bobbin, a current coil mounted on said bobbin, a rotor rotatably supported by said bobbin, a pair of contact elements secured to said bobbin with one of said elements movable, a crank pin on said rotor and a link connected to said crank pin for moving said movable element in response to the rotation of said rotor, rotation of said rotor being in response to flux generated by said potential and current coils.

12. A watt sensitive relay according to claim 10 further characterized in that said bobbin unit is also provided with spring means resisting rotation of said rotor.

13. A watt sensitive relay according to claim 10 further characterized in that said bobbin unit is also provided with spring means carrying said movable contact element and resisting rotation of said rotor.

14. A watt sensitive relay according to claim 10 further characterized in that said bobbin unit is also provided with interengaging stop means on said bobbin and said rotor for limiting rotation of said rotor.

15. A watt sensitive relay according to claim 10 further characterized in that said bobbin unit is also provided with interengaging stop means on said bobbin and said rotor for limiting rotation of said rotor, said stop means comprising a pair of spaced ribs on said bobbin and a wing on said rotor extending between said ribs.

16. A watt sensitive relay according to claim 10 further characterized in that said bobbin unit is also provided with a leaf spring carrying said movable contact member and resisting movement thereof, and a calibrating screw for adjusting the resistance of said spring.

17. A watt sensitive device of the character described comprising a potential coil unit comprising a core structure, and a potential coil around a portion of said core structure, and a pre-assembled bobbin unit comprising a bobbin, a current coil mounted on said bobbin, a squirrel cage rotor comprising a core member of magnetic material and a pair of interconnected non-magnetic conductive plates on the faces of said core member, said rotor being rotatably supported by said bobbin, and a mechanism movable in response to the rotation of said rotor, rotation of said rotor being in response to flux generated by said potential and current coils.

18. A watt sensitive device of the character described comprising a potential coil unit comprising a core structure, and a potential coil around a portion of said core structure, and a pre-assembled bobbin unit comprising a bobbin, a current coil mounted on said bobbin, a squirrel cage rotor comprising a core member and a pair of plates on the faces of said core member, one of said plates having a wing extending therefrom, a pair of ribs on said bobbin engageable by said wing for limiting the rotation of said rotor, and a mechanism movable in response to the rotation of said rotor, rotation of said rotor being in response to flux generated by said potential and current coils.

19. In a watt sensitive device of the character described comprising a core structure having a bar constructed to provide an external magnetic field and having a potential coil mounted on said core structure and a current operatively associated with said bar, a rotor mounted in the magnetic field of said current coil and said external field and comprising a core member of magnetic material and a pair of non-magnetic conductive plates mounted on the ends of said core member and having interconnected prongs on the periphery of said core member.

20. In a watt sensitive device of the character described comprising a core structure having a bar constructed to provide an external magnetic field and having a potential coil mounted on said core structure and a current coil operatively associated with said bar portions, a squirrel cage rotor mounted in the magnetic field of said current coil and said external field and comprising a core member of magnetic material having on its periphery a plurality of equally spaced slots parallel to its axis of rotation, and a pair of non-magnetic conductive plates mounted on the ends of said core member and having a plurality of interconnected prongs positioned in said slots.

21. In a watt sensitive device of the character described comprising a core structure having a pair of spaced bar portions constructed to provide an external magnetic field and having a potential coil mounted on said core structure and a current coil mounted between said bar portions, a squirrel cage rotor mounted in the magnetic field of said current coil between said bar portions in said external field and comprising a core member magnetic material having on it periphery a plurality of equally spaced slots parallel to its axis of rotation, and a pair of non-magnetic conductive plates mounted on the ends of said core member and having a plurality of prongs other and being soldered together to form continuous electrical paths through said slots.

22. In a watt sensitive device of the character described comprising a core structure having a pair of spaced bar portions constructed to provide an external magnetic field and having a potential coil mounted on said core structure and a current coil mounted between said bar portions, a rotor mounted in the magnetic field of said current coil between said bar portions in said external field and comprising a sintered high density powdered iron core member, and a pair of copper plates mounted on the ends of said core member and having a plurality of equally spaced interconnected prongs on the extending into said slots in overlapping relation with each periphery of said core member.

No references cited.